US012701545B2

(12) United States Patent
Lauridsen et al.

(10) Patent No.: US 12,701,545 B2
(45) Date of Patent: Aug. 4, 2026

(54) CLUSTERING PAGING OCCASIONS FOR MULTIPLE USER EQUIPMENTS IN TIME DOMAIN

(71) Applicant: Nokia Technologies Oy, Espoo (FI)

(72) Inventors: Mads Lauridsen, Gistrup (DK); Daniela Laselva, Klarup (DK); Frank Frederiksen, Klarup (DK)

(73) Assignee: NOKIA TECHNOLOGIES OY, Espoo (FI)

( * ) Notice: Subject to any disclaimer, the term of this patent is extended or adjusted under 35 U.S.C. 154(b) by 819 days.

(21) Appl. No.: 17/919,683

(22) PCT Filed: Apr. 23, 2020

(86) PCT No.: PCT/EP2020/061347
§ 371 (c)(1),
(2) Date: Oct. 18, 2022

(87) PCT Pub. No.: WO2021/213657
PCT Pub. Date: Oct. 28, 2021

(65) Prior Publication Data
US 2023/0189211 A1      Jun. 15, 2023

(51) Int. Cl.
*H04W 68/02*          (2009.01)
*H04L 5/00*           (2006.01)

(52) U.S. Cl.
CPC ............. *H04W 68/02* (2013.01); *H04L 5/005* (2013.01)

(58) Field of Classification Search
CPC ............. H04W 68/02; H04W 52/0206; H04W 52/0219; H04W 52/0235; H04L 5/005; Y02D 30/70
See application file for complete search history.

(56) References Cited

U.S. PATENT DOCUMENTS

2019/0159169 A1*  5/2019  Reial .................. H04W 68/005
2019/0215799 A1   7/2019  Talebi Fard et al.
(Continued)

FOREIGN PATENT DOCUMENTS

CN      108702732 A     10/2018
EP        2453710 A1     5/2012
(Continued)

OTHER PUBLICATIONS

Notice of Allowance received for corresponding Chinese Patent Application No. 202080100111.3, dated Aug. 1, 2024, 4 pages of original Notice of Allowance and no pages of English translation available.

(Continued)

*Primary Examiner* — Kathy W Wang-Hurst
(74) *Attorney, Agent, or Firm* — Carter, DeLuca & Farrell LLP

(57)            ABSTRACT

Techniques for paging user equipments (UEs) in a wireless communication network include clustering paging occasions of multiple UEs in a time domain on the network node side and broadcasting at least one reference signal from the network node for the UEs shortly before the clustered POs, thereby providing the power saving benefit for the UEs and without having to impose a much larger power consumption of the network node itself or cause the network node to be always on to broadcast the at least one reference signal. The at least one reference signal broadcasted may be based on SSBs, TRS and/or CSI-RS. Thus, the techniques allow the reference signals to be made available for the UEs in the RRCJDLE/RRCJN ACTIVE state too.

16 Claims, 9 Drawing Sheets

300

S302 — Among a set of UEs that is in an idle or suspended RAN connection state within a predefined tracking area, determining a subset of UEs for which paging occasions should clustered S304 — Clustering the POs for the subset of UEs in a time domain S306 — Selecting at least one reference signal to be broadcasted before the clustered POs in the time domain S308 — Broadcasting the at least one reference signal before the clustered POs in the time domain

(56)　　　　　References Cited

U.S. PATENT DOCUMENTS

| | | | |
|---|---|---|---|
| 2019/0229973 A1* | 7/2019 | Sengupta | H04J 11/0079 |
| 2020/0037247 A1 | 1/2020 | Liao et al. | |
| 2020/0107294 A1 | 4/2020 | Ji et al. | |

FOREIGN PATENT DOCUMENTS

| | | | |
|---|---|---|---|
| WO | | 2019/063479 A1 | 4/2019 |
| WO | WO 2019/096858 A1 | | 5/2019 |
| WO | | 2019/192006 A1 | 10/2019 |
| WO | | 2019/243450 A1 | 12/2019 |
| WO | | 2019/243457 A1 | 12/2019 |
| WO | | 2019/246425 A1 | 12/2019 |
| WO | | 2020/032868 A1 | 2/2020 |
| WO | | 2020/033648 A1 | 2/2020 |
| WO | | 2020/060696 A1 | 3/2020 |
| WO | | 2020/065004 A1 | 4/2020 |
| WO | | 2020/178483 A1 | 9/2020 |

OTHER PUBLICATIONS

Office Action received for corresponding European Patent Application No. 20721536.9, dated Aug. 6, 2024, 3 pages.

"New WID: UE Power Saving Enhancements", 3GPP TSG RAN Meeting #86, RP-193239, Agenda: 9.1.2, MediaTek Inc, Dec. 9-12, 2019, 5 pages.

"3rd Generation Partnership Project; Technical Specification Group Radio Access Network; NR; Physical layer procedures for data (Release 16)", 3GPP TS 38.214, V16.0.0, Dec. 2019, pp. 1-147.

"3rd Generation Partnership Project; Technical Specification Group Radio Access Network; NR; Radio Resource Control (RRC) protocol specification (Release 15)", 3GPP TS 38.331, V15.8.0, Dec. 2019, pp. 1-532.

"3rd Generation Partnership Project; Technical Specification Group Radio Access Network; NR; User Equipment (UE) procedures in Idle mode and RRC Inactive state (Release 15)", 3GPP TS 38.304, V15.6.0, Dec. 2019, pp. 1-30.

Office action received for corresponding Chinese Patent Application No. 202080100111.3, dated Mar. 26, 2024, 7 pages, no page of translation available.

"Consideration on NR RRM for UE power saving", 3GPP TSG RAN WG1 Meeting #96bis, R1-1904798, Agenda: 7.2.9.3, Spreadtrum Communications, Apr. 8-12, 2019, 9 pages.

Mediatek Inc., "UE Group Wake-up Signal for NB-IOT," 3GPP TSG-RAN WG2 Meeting #103bis, R2-1813719, Chengdu, China, Oct. 8-12, 2018.

Intel Corporation, "System level evaluation of UE power saving schemes," 3GPP TSG RAN WG1 Meeting #96, R1-1902507, Athens, Greece, Feb. 25-Mar. 1, 2019.

Office action received for corresponding Indian Patent Application No. 202217056661, dated Feb. 6, 2026, 8 pages.

* cited by examiner

600

S602  Waking up a UE before a PO associated with the UE, the PO being configured in accordance with the method 300

S604  Receiving at least one RS broadcasted before the PO in the time domain

S606  Performing time-frequency synchronization with a network node and/or channel estimation based on the at least one RS S608  Monitoring a paging message for the UE during the PO

CLUSTERING PAGING OCCASIONS FOR MULTIPLE USER EQUIPMENTS IN TIME DOMAIN

CROSS REFERENCE TO RELATED APPLICATION

This patent application is a U.S. National Stage application of International Patent Application Number PCT/EP2020/061347 filed Apr. 23, 2020, which is hereby incorporated by reference in its entirety.

TECHNICAL FIELD

The present disclosure relates generally to the field of wireless communications, and in particular to techniques for paging user equipments (UEs) in a wireless communication network.

BACKGROUND

As compared to the Long-Term Evolution (LTE) standard, the 5G New Radio (NR) standard does not define a type of an omnipresent cell-specific reference signal, but instead relies on Synchronization Signal Blocks (SSBs) to provide periodic reference signals to UEs for time-frequency synchronization and cell selection. If required, the 5G NR standard also allows further reference signals to be configured for the UEs that are in a Radio Resource Control (RRC) Connected (RRC_CONNECTED) state in a UE-dedicated fashion. These further configurable reference signals may include a Demodulation Reference signals, a Phase-Tracking Reference Signal (PTRS), a Sounding Reference Signal (SRS), and a Channel State Information Reference Signal (CSI-RS).

When a UE moves from the RRC_CONNECTED state to an RRC Idle (RRC_IDLE) state or an RRC Inactive (RRC_INACTIVE) state, all the further configurable reference signals, which were available for the UE in the RRC_CONNECTED state, are released and all procedures for the UE in the RRC_IDLE/RRC_INACTIVE state, such, for example, as paging, are based on the SSBs only. Thus, in the 5G NR standard, the UEs in the RRC_IDLE/RRC_INACTIVE state rely on receiving the SSBs both for cell quality measurements (which are required for cell (re)selection) and for time-frequency synchronization. The SSBs may be configured for each cell in terms of a number of SSBs per frequency, an SSB burst periodicity (among 5, 10, 20 . . . , 160 ms) and its offset.

The paging is a procedure used by a 5G-NR gNodeB (gNB) to inform the UE of an incoming data/call. A paging message requests the UE to attach to a Radio Access Network (RAN). The gNB uses the paging procedure mainly because it does not know the location of the UE within the RAN, e.g., when the UE is in the RRC_IDLE state. Thus, the paging is the first procedure performed by the gNB to establish a connection with the UE.

If the SSBs are sent by the gNB to the UE in the RRC_IDLE/RRC_INACTIVE state with a large periodicity, e.g. 80 or 160 subframes, the UE, which is monitoring for the paging, should wake up well in advance of a paging occasion in order to receive the SSBs. This increases a UE power consumption. However, if the gNB instead transmits the SSBs more frequently (e.g., with a frequency of 5 ms), the UE power consumption will decrease at the cost of a higher gNB power consumption. Further, the gNB transmitting the SSBs at such increased frequency would also introduce an additional constant overhead to the whole communication network.

SUMMARY

This summary is provided to introduce a selection of concepts in a simplified form that are further described below in the detailed description. This summary is not intended to identify key features or essential features of the present disclosure, nor is it intended to be used to limit the scope of the present disclosure.

It is an objective of the present disclosure to provide a technical solution that enables energy-efficient paging for UEs and network nodes in a wireless communication network, such as the RAN.

The objective above is achieved by the features of the independent claims in the appended claims. Further embodiments and examples are apparent from the dependent claims, the detailed description and the accompanying drawings. The embodiments that do not fall under the scope of the claims are to be interpreted as examples useful for understanding the disclosure.

According to a first aspect, a network node is provided. The network node comprises a transceiver, a memory, and at least one processor. The memory is configured to store processor-executable instructions. The at least one processor is coupled to the memory and configured, when executing the processor-executable instructions, to:

among a set of UEs that is in an idle or suspended Radio Access Network (RAN) connection state within a predefined tracking area, determine a subset of UEs for which paging occasions should be clustered;

cluster the paging occasions for the subset of UEs in a time domain;

select at least one reference signal to be broadcasted before the clustered paging occasions in the time domain; and cause the transceiver to broadcast the at least one reference signal before the clustered paging occasions in the time domain.

In this configuration, the network node may send one or more reference signals to the UEs, for which the paging occasions are clustered in the time domain, at a certain time, i.e. shortly before the clustered paging occasions, thereby providing a power saving benefit for the UEs. At the same time, this configuration neither requires the significant power consumption of the network node nor causes the network node to be always on to broadcast the reference signals.

In one example embodiment of the first aspect, the at least one reference signal comprises a Synchronization Signal Block (SSB) comprising a Downlink Positioning Reference Signal (DLPRS), a Primary Synchronization Signal (PSS) and a Secondary Synchronization Signal (SSS), a Tracking Reference Signal (TRS), a Channel State Information Reference Signal (CSI-RS), or any combination thereof. By so doing, it is possible to make the reference signals, which are usually used only for the UEs in an active RAN connection state (such as RRC_CONNECTED in terms of the RRC protocol), also available for the UEs in the idle or suspended RAN connection state (such as RRC_IDLE or RRC_INACTIVE in terms of the RRC protocol).

In one example embodiment of the first aspect, the transceiver is further configured to receive UE notifications and/or preferences from the subset of UEs. Each UE notification indicates that a certain UE is within the predefined tracking area. Each UE preference indicates that a certain UE requests the network node to broadcast the at least one reference signal before its paging occasion (that is, the UE is configured for said clustering). In this example embodiment, the at least one processor is configured to perform said determining based on the UE notifications and/or preferences. By using such UE notifications and/or preferences, the network node may be aware of those UEs which are really within the tracking area and whose configuration is suitable for said clustering, thereby optimizing power costs for broadcasting the reference signals to the UEs.

In one example embodiment of the first aspect, the predefined tracking area is a RAN Notification Area (RNA), and the transceiver is configured to receive the UE notifications sent by the subset of UEs via an RNA update (RNAU) procedure. This may make the network node applicable in a 5G NR communication technology.

In one example embodiment of the first aspect, the at least one processor is further configured, before said broadcasting, to cause the transceiver to inform the subset of UEs about the at least one reference signal by sending a presence indicator, a broadcasting-time indicator and/or a timer indicator for the at least one reference signal to the subset of UEs. In this example embodiment, the presence indicator indicates that the at least one reference signal will be broadcasted before the clustered paging occasions, the broadcasting-time indicator indicates a time offset and/or a time window between the at least one reference signal and the clustered paging occasions, and the timer indicator indicates that the at least one reference signal will be repeatedly broadcasted for a predefined number of next paging occasions for the subset of UEs or for a predefined time period. By so doing, it is possible to inform the UEs about the at least one reference signal, if required, and to ensure that the network node does not enter a state where it always broadcasts the at least one reference signal.

In one example embodiment of the first aspect, the transceiver is further configured to send, to each UE of the subset of UEs, the presence indicator, the broadcasting-time indicator and/or the timer indicator in a System Information Broadcast (SIB) message, a Downlink Control Information (DCI) message or via Radio Resource Control (RRC) signalling at the time when that UE is moved to the idle or suspended RAN connection state. This may allow the reference signals to be used more efficiently.

In one example embodiment of the first aspect, the at least one processor is further configured to cause the transceiver to broadcast a control signal together with the at least one reference signal. In this example embodiment, the control signal indicates that the predefined number of next clustered paging occasions or the predefined time period indicated in the timer indicator will be changed in a given way. By so doing, it is possible to keep the UEs promptly informed about any changes relating to the timer indicator.

In one example embodiment of the first aspect, the at least one processor is configured to perform said clustering the paging occasions if a size of the subset of UEs is more than a threshold value. By so doing, it is possible to reasonably use said clustering only for the case of multiple UEs; when the number of the UEs is low, i.e. less than the threshold value, the network node may initially align the paging occasions of the UEs with the SSBs.

According to a second aspect, a method for operating a network node is provided. The method starts with the step of determining, among a set of UEs that is in an idle or suspended RAN connection state within a predefined tracking area, a subset of UEs for which paging occasions should be clustered. Then, the method proceeds to the steps of clustering the paging occasions for the subset of UEs in a time domain and selecting at least one reference signal to be broadcasted before the clustered paging occasions in the time domain. The method ends up with the step of broadcasting the at least one reference signal before the clustered paging occasions in the time domain. By so doing, it is possible to send one or more reference signals to the UEs, for which the paging occasions are clustered in the time domain, at a certain time, i.e. shortly before the clustered paging occasions, thereby providing a power saving benefit for the UEs (because each UE may wake up and receive the at least one reference signal within a short time period due to of the broadcasting of the at least one reference signal shorty before the clustered paging occasions in the time domain). At the same time, this method neither requires the significant power consumption of the network node nor causes the network node to be always on to broadcast the at least one reference signal.

In one example embodiment of the second aspect, wherein the at least one reference signal comprises a DLPRS, an SSB comprising a PSS and an SSS, a TRS, a CSI-RS, or any combination thereof. By so doing, it is possible to make the reference signals, which are usually available only for the UEs in an active RAN connection state (such as RRC_CONNECTED in terms of the RRC protocol), also available for the UEs in the idle or suspended RAN connection state (such as RRC_IDLE or RRC_INACTIVE in terms of the RRC protocol).

In one example embodiment of the second aspect, the method further comprises the step of receiving UE notifications and/or preferences from the subset of UEs. Each UE notification indicates that a certain UE is within the predefined tracking area. Each UE preference indicates that a certain UE requests for the network node to broadcast the at least one reference signal before its paging occasion (that is, the UE is configured for said clustering). In this example embodiment, the step of determining the at least two UEs is performed based on the UE notifications and/or preferences. By using such UE notifications and/or preferences, the network node may be aware of those UEs which are really within the tracking area and whose configuration is suitable for said clustering, thereby optimizing power costs for broadcasting the reference signals.

In one example embodiment of the second aspect, the predefined tracking area is an RNA, and the step of receiving comprises receiving the UE notifications sent by the subset of UEs via an RNAU procedure. This may make the method according to the second aspect applicable in the 5G NR communication technology.

In one example embodiment of the second aspect, the method further comprises, before the step of broadcasting, the step of informing the subset of UEs about the at least one reference signal by sending a presence indicator, a broadcasting-time indicator and/or a timer indicator for the at least one reference signal to the subset of UEs. In this example embodiment, the presence indicator indicates that the at least one reference signal will be broadcasted before the clustered paging occasions, the broadcasting-time indicator indicates a time offset and/or a time window between the at least one reference signal and the clustered paging occasions, and the timer indicator indicates that the at least one reference signal will be repeatedly broadcasted for a predefined number of next paging occasions for the subset of UEs or for a predefined time period. By so doing, it is possible to inform the UEs about the at least one reference signal, if required, and to ensure that the network node does not enter a state where it always broadcasts the at least one reference signal.

In one example embodiment of the second aspect, the step of sending the presence indicator, the broadcasting-time indicator and/or the timer indicator comprises sending, to each UE of the subset of UEs, the presence indicator, the broadcasting-time indicator and/or the timer indicator in a SIB message, a DCI message or via RRC signalling at the time when that UE is moved to the idle or suspended RAN connection state. This may allow the reference signals to be used more efficiently.

In one example embodiment of the second aspect, the method further comprises the step of broadcasting a control signal together with the at least one reference signal. In this example embodiment, the control signal indicates that the predefined number of next clustered paging occasions or the predefined time period indicated in the timer indicator will be changed in a given way. By so doing, it is possible to keep the UEs promptly informed about any changes relating to the timer indicator.

In one example embodiment of the second aspect, the step of clustering the paging occasions is performed if a size of the subset of UEs is more than a threshold value. By so doing, it is possible to reasonably use said clustering only for the case of multiple UEs; when the number of the UEs is low, i.e. less than the threshold value, the network node may initially align the paging occasions of the UEs with the SSBs.

According to a third aspect, a computer program product is provided, which comprises a computer-readable medium having a computer code stored thereon. The computer code, when executed by at least one processor, causes the at least one processor to perform the method according to the second aspect of the present disclosure. This may simplify the implementation of the method according to the second aspect of the present disclosure.

According to a fourth aspect, a UE for wireless communications is provided. The UE is in an idle or suspended RAN connection state within a predefined tracking area of the network node according to the first aspect. The UE comprises a transceiver, a memory storing processor-executable instructions, and at least one processor coupled to the memory. The at least one processor is configured, when executing the processor-executable instructions, to cause the transceiver to wake up before a paging occasion associated with the UE. The paging occasion is configured by the network node according to the first aspect. The transceiver is then caused by the at least one processor to receive at least one reference signal broadcasted by the network node according to the first aspect before the paging occasion in the time domain. The transceiver is further caused by the at least one processor to perform time-frequency synchronization with the network node according to the first aspect and/or channel estimation based on the at least one reference signal and monitor a paging message for the UE during the paging occasion. In this configuration, the UE may wake up and receive the reference signals within a short time period due to the broadcasting of the reference signals shorty before the clustered paging occasions for that UE and one or more other UEs in the time domain.

According to a fifth aspect, a method for operating a UE for wireless communications is provided. The UE is in an idle or suspended RAN connection state within a predefined tracking area of the network node according to the first aspect. The method starts with the step of waking up the UE before a paging occasion associated with the UE. The paging occasion is configured by the network node according to the first aspect. The method further proceeds to the steps of receiving at least one reference signal broadcasted by the network node according to the first aspect before the paging occasion in the time domain and performing time-frequency synchronization with the network node according to the first aspect and/or channel estimation based on the at least one reference signal. The method ends up with the step of monitoring a paging message for the UE during the paging occasion. By so doing, the UE may wake up and receive the reference signals within a short time period due to the broadcasting of the reference signals shorty before the clustered paging occasions for that UE and one or more other UEs in the time domain. Given this, the UE may gain a power saving benefit.

According to a sixth aspect, a computer program product is provided, which comprises a computer-readable medium having a computer code stored thereon. The computer code, when executed by at least one processor, causes the at least one processor to perform the method according to the fifth aspect of the present disclosure. This may simplify the implementation of the method according to the fifth aspect of the present disclosure.

According to a seventh aspect, a network node is provided. The network node comprises a transceiving means, a storing means, and a processing means. The storing means is configured to store processor-executable instructions. The processing means is coupled to the storing means and configured, when executing the processor-executable instructions, to:

among a set of UEs that is in an idle or suspended RAN connection state within a predefined tracking area, determine a subset of UEs for which paging occasions should be clustered;

cluster the paging occasions for the subset of UEs in a time domain;

select at least one reference signal to be broadcasted before the clustered paging occasions in the time domain; and cause the transceiving means to broadcast the at least one reference signal before the clustered paging occasions in the time domain.

In this configuration, the network node may broadcast one or more the reference signals, for which the paging occasions are clustered in the time domain, at a certain time, i.e. shortly before the clustered paging occasions, thereby providing a power saving benefit for the UEs. At the same time, this configuration neither requires the significant power consumption of the network node nor causes the network node to be always on to broadcast the reference signals.

According to an eighth aspect, a UE for wireless communications is provided. The UE is in an idle or suspended RAN connection state within a predefined tracking area of the network node according to the seventh aspect. The UE comprises a transceiving means, a storing means and a processing means. The storing means is configured to store processor-executable instructions. The processing means is coupled to the storing means and configured, when executing the processor-executable instructions, to cause the transceiving means to wake up before a paging occasion associated with the UE. The paging occasion is configured by the network node according to the seventh aspect. The transceiving means is then caused by the processing means to receive at least one reference signal broadcasted by the network node according to the seventh aspect before the paging occasion in the time domain. The transceiving means is further caused by the processing means to perform time-frequency synchronization with the network node according to the seventh aspect and/or channel estimation based on the at least one reference signal and monitor a paging message for the UE during the paging occasion. In this configuration, the UE may wake up and receive the reference signals within a short time period due to the broadcasting of the reference signals shorty before the clustered paging occasions for that UE and one or more other UEs in the time domain.

Other features and advantages of the present disclosure will be apparent upon reading the following detailed description and reviewing the accompanying drawings.

BRIEF DESCRIPTION OF THE DRAWINGS

The essence of the present disclosure is explained below with reference to the accompanying drawings in which.

DETAILED DESCRIPTION

Figure 1:
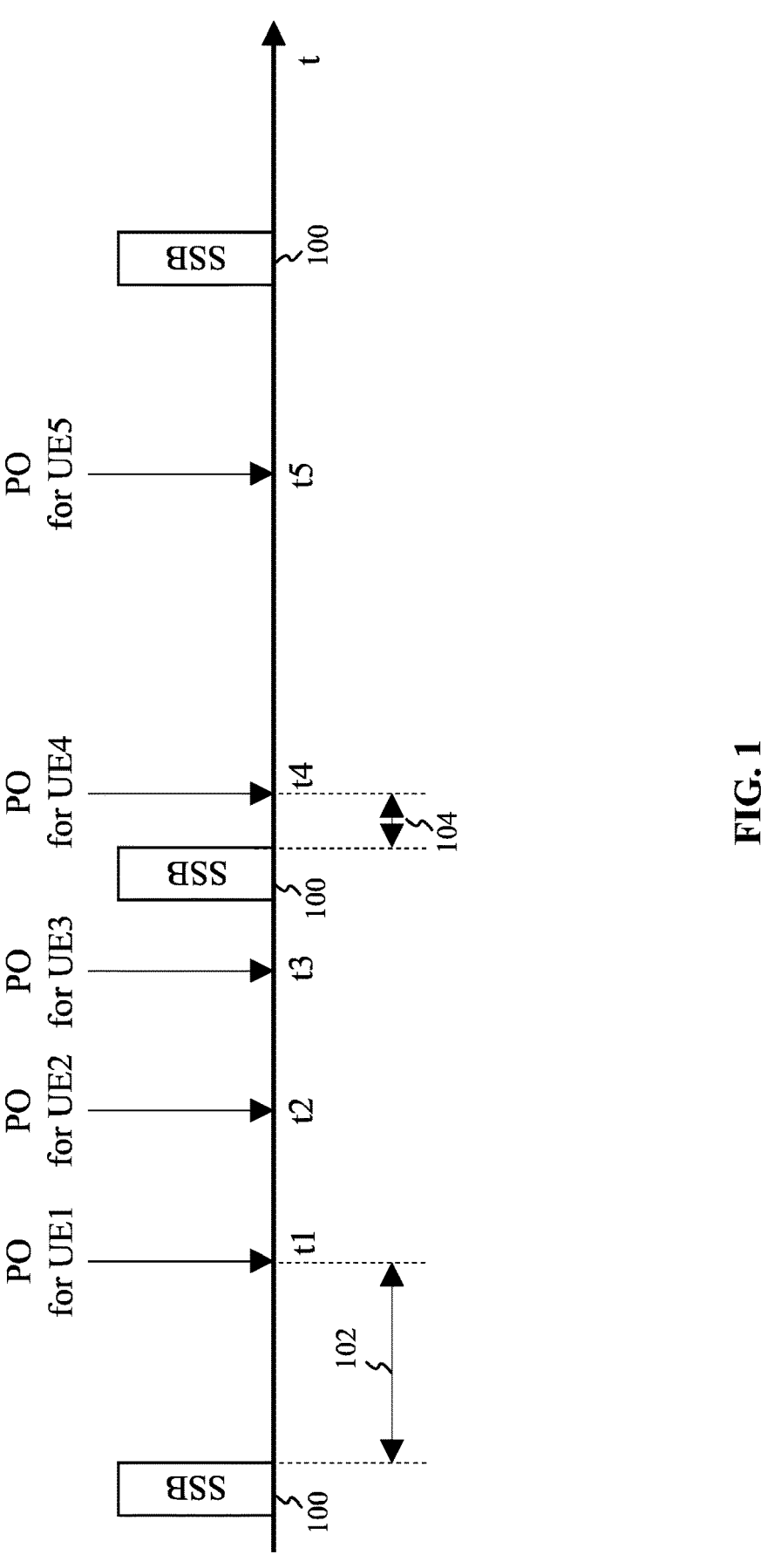
FIG. 1 shows a possible sequence of paging occasions for different UEs in a time domain.

Various embodiments of the present disclosure are further described in more detail with reference to the accompanying drawings. However, the present disclosure can be embodied in many other forms and should not be construed as limited to any certain structure or function discussed in the following description. In contrast, these embodiments are provided to make the description of the present disclosure detailed and complete.

According to the detailed description, it will be apparent to the ones skilled in the art that the scope of the present disclosure encompasses any embodiment thereof, which is disclosed herein, irrespective of whether this embodiment is implemented independently or in concert with any other embodiment of the present disclosure. For example, the apparatus and method disclosed herein can be implemented in practice by using any numbers of the embodiments provided herein. Furthermore, it should be understood that any embodiment of the present disclosure can be implemented using one or more of the elements presented in the appended claims.

The word "example" is used herein in the meaning of "used as an illustration". Unless otherwise stated, any embodiment described herein as "example" should not be construed as preferable or having an advantage over other embodiments.

According to the example embodiments disclosed herein, a user equipment or UE for short may refer to a mobile device, a mobile station, a terminal, a subscriber unit, a mobile phone, a cellular phone, a smart phone, a cordless phone, a personal digital assistant (PDA), a wireless communication device, a laptop computer, a tablet computer, a gaming device, a netbook, a smartbook, an ultrabook, a medical device or medical equipment, a biometric sensor, a wearable device (for example, a smart watch, smart glasses, a smart wrist band), an entertainment device (for example, an audio player, a video player, etc.), a vehicular component or sensor, a smart meter/sensor, industrial manufacturing equipment, a global positioning system (GPS) device, an Internet-of-Things (IoT) device, a machine-type communication (MTC) device, a group of Massive IoT (MIoT) or Massive MTC (mMTC) devices/sensors, or any other suitable device configured to support wireless communications. In one other example embodiment, the UE may refer to at least two collocated and inter-connected UEs thus defined.

According to the example embodiments disclosed herein, a network node may relate to a node of a Radio Access Network (RAN), such as a Global System for Mobile Communications (GSM) RAN (GRAN), a GMS EDGE RAN (GERAN), a Universal Mobile Telecommunications System (UMTS) RAN (UTRAN), a Long-Term Evolution (LTE) UTRAN (E-UTRAN), Next-Generation (NG) RAN. Such a network node is used to connect the UE to a Data Network (DN) through a Core Network (CN), and is referred to as a base transceiver station (BTS) in terms of the 2G communication technology, a NodeB in terms of the 3G communication technology, an evolved NodeB (eNodeB) in terms of the 4G communication technology, and a gNodeB (gNB) in terms of the 5G communication technology and New Radio (NR) air interface.

According to the example embodiments disclosed herein, an active RAN connection state may refer to a state where the UE is connected to the RAN and the CN via the network node and is able to receive and transmit a data traffic with no restriction of data size, and a suspended RAN connection state may refer to a state where the UE maintains information relating to its preceding connection to the RAN via the network node, but in a suspended fashion, in which either no data traffic is temporarily available to the UE or data traffic is available with some restriction of data size. In the 5G NR standard, these RAN connection states are defined in accordance with a Radio Resource Control (RRC) protocol, for which reason the active RAN connection state is called RRC_CONNECTED and the suspended RAN connection state is called RRC_INACTIVE. There is also an idle RAN connection state, i.e. RRC_IDLE, in which the UE has no connection with the RAN nor the CN, thereby significantly reducing power consumption similarly to the RRC_INACTIVE state. It should be noted that the present disclosure is not limited to the above-defined RRC states, and any other similar connection states, which are already existing or may be invented in future, may be used instead of the RRC states.

As used in the example embodiments disclosed herein, paging may refer to a mechanism performed by the network node to inform the UE of incoming data or an incoming call. As a rule, the UE is in the idle RAN connection state (e.g., RRC_IDLE in terms of the RRC protocol) or the suspended RAN connection state (e.g., RRC_INACTIVE in terms of the RRC protocol) when the paging occurs. In the idle RAN connection state, the UE may perform discontinuous reception (DRX). In other words, the UE sleeps during one part of a DRX cycle and wakes up during another part of the DRX cycle to check if a paging message is being sent to the UE. Moreover, the UE needs to receive some kind of reference signals prior to receiving the paging message (to ensure time-frequency synchronization with the network node and, consequently, a sufficient decoding performance). Thus, the UE is required to spend energy (from its battery or another energy sources, such, for example, as those taking energy from the environment in the form of sunlight, etc.) in the idle RAN connection state to periodically receive the reference signals and monitor paging messages. The UE receives and decodes the paging message, and then the UE initiates an appropriate procedure. For example, the paging message issued by the network node to the UE may cause the UE to establish a Non-Access Stratum (NAS) signalling connection.

The network node typically uses a Physical Downlink Control Channel (PDCCH) to transmit paging control information to the UE. The paging control information may include resource allocation information that specifies the location of paging payload information (e.g., International Mobile Subscriber Identity (IMSI), a packet-switched (PS)/circuit-switched (CS) transfer indicator bit, etc.) transmitted over a Physical Downlink Shared Channel (PDSCH). During the idle RAN connection state, the UE periodically wakes up and monitors the PDCCH in order to detect the presence of the paging message (or paging payload information, in other words) in the PDSCH. When a plurality of UEs are paged, the payload information may include a plurality of IMSIs and a plurality of corresponding PS/CS transfer indicators bits.

The network node may use a Paging Radio Network Temporary Identifier (P-RNTI) to scramble at least a portion of the paging control information. The network node transmits the paging control information, including the scrambled portion, in the PDCCH. The P-RNTI is a temporary identity used for the paging and is not unique to any particular UE. When the UE detects the presence of the P-RNTI scrambled portion in the PDCCH, it decodes the paging control information and uses the paging control information to decode a paging channel (PCH) in the PDSCH (if the UE does not detect the presence of the P-RNTI scrambled portion, the UE may go back to sleep). The PCH contains the paging payload information. As noted above, the paging payload information may include the IMSI of the target device to be paged. The UE checks the IMSI to determine if it equals the IMSI of the UE itself. If the included IMSI is the not the same as the IMSI of the UE, the UE may go back to sleep (that is, the paging message is not intended for this UE). Alternatively, if the IMSI is equal to the IMSI of the UE, the UE may initiate an appropriate procedure to connect to the RAN.

The network node may also use different System Information Blocks (SIBs) to provide information about various parameters of both the Access Stratum and Non-Access Stratum to the UEs. The SIBs may include, among others, parameters that are used by the UE to determine frames and subframes in which the UE will wake up and look for the paging messages. These parameters may be found in System Information Block 2 (SIB2). The SIB2 may include a default paging cycle (usually abbreviated as T) and a parameter nB that is a multiple of the paging cycle T (i.e. it may take on values such, for example, as 4T, 2T, T, T/2, T/4, T/8, T/16, T/32). These parameters are used by the UE to determine an identifier for a paging frame (PF) and an identifier for a paging occasion (PO). The PF is a radio frame which may contain one or more POs for a set of UEs. The PO is a specific time instant where the network node may transmit the paging message(s) for a subset of UEs corresponding to the same PF.

According to the example embodiments disclosed herein, a reference signal, also referred to as a pilot signal or tone, may relate to a known (for both the UE and the network node) signal used for various reasons, such as to synchronize timing, estimate a channel, and/or noise in the channel. Reference signals may be received and transmitted by the network node and the UE. Different types of the reference signals may be used in a physical resource block. For example, the 5G NR standard supports the following reference signals: a Downlink Positioning Reference Signal (DLPRS), a Demodulation Reference Signal (DMRS), a Phase-Tracking Reference Signal (PTRS), a Channel-State Information Reference Signal (CSI-RS), a Tracking Reference Signal (TRS), a Primary Synchronization Signal (PSS) and a Secondary Synchronization Signal (SSS). The PSS and the SSS, together with a Physical Broadcast Channel (PBCH), form a Synchronization Signal Block (SSB). Additionally, the SSB has the DMRS for the PBCH.

When the UE moves from the RRC_CONNECTED state to the RRC_IDLE state or RRC_INACTIVE state, all the reference signals, which were available for the UE in the RRC_CONNECTED state, such, for example, as the TRS and the CSI-RS, are released and, in particular, the paging procedure for the UE in the RRC_IDLE/RRC_INACTIVE state is based only on SSBs. Thus, the UE in the RRC_IDLE/RRC_INACTIVE state relies on receiving the SSBs both for cell quality measurements (which are required to perform cell (re) selection) and for time-frequency synchronization. The SSBs may be configured for each cell in terms of a number of SSBs per frequency, an SSB burst periodicity (among 5, 10, 20, . . . , 160 ms) and its offset. SSB timing synchronization across neighbour cells is also assumed.

FIG. 1 shows a possible sequence of POs for different UEs in a time domain. In particular, it is assumed that the network node (not shown) is configured to periodically broadcast an SSB 100, and five UEs, which are denoted as UE1, UE2, UE3, UE4 and UE5, are configured to periodically receive the SSB 100. Each of the five UEs is assumed to be in the idle or suspended RAN connection state and has its own PO: time t1 corresponds to the PO for UE1, time t2 corresponds to the PO for UE2, time t3 corresponds to the PO for UE3, time t4 corresponds to the PO for UE4, and time t5 corresponds to the PO for UE5. As noted above, the SSB 100 is used by each UE to provide its time-frequency synchronization with the network node and/or channel estimation, and this time-frequency synchronization and/or channel estimation should be performed to make it possible for the UE to receive the paging message, if present, at the corresponding PO. As shown in FIG. 1, for example, the PO for UE1 is significantly time-spaced from the nearest SSB 100, whereupon UE1 has a long waiting period 102 between the receiving time of the nearest SSB 100 and its PO (time t1), during which UE1 should be on, thereby leading to the high power consumption of UE1. The PO for UE4 is the only PO which is time-spaced from the nearest SSB 100 such that there is a reasonable (short) waiting period 104 between the receiving time of the nearest SSB 100 and the PO for UE4 (time t4), thereby leading to the low power consumption of the UE4.

The above-mentioned problem of the long waiting period becomes even more critical when the SSB 100 are broadcasted for UE1, UE2, UE3, UE4 and UE5 with a large periodicity, e.g. 80 or 160 subframes. In this case, UE1, UE2, UE3, UE4 and UE5, which are monitoring for paging, should wake up well in advance of their POs in order to receive the SSB 100. This increases the power consumption of each UE even more. At the same time, if the network node instead sends the SSB 100 more frequently (e.g. with a higher frequency of 5 ms), the power consumption of each UE will decrease but at the cost of a higher power consumption of the network node itself. Furthermore, the network node sending the SSB 100 at an increased frequency would also introduce an additional constant overhead to the whole communication network, such as the RAN.

The example embodiments disclosed herein provide a technical solution that allows mitigating or even eliminating the above-sounded drawbacks peculiar to the prior art. In particular, the technical solution involves clustering the POs for multiple UEs in the time domain on the network node side and broadcasting at least one reference signal from the network node shortly before the clustered POs, thereby providing the power saving benefit for the UEs and without having to impose a much larger power consumption of the network node itself or cause the network node to be always on to broadcast the at least one reference signal. The at least one reference signal broadcasted by the network node may be based on the SSBs or any part thereof (e.g., the SSS only or the combination of the PSS and the SSS), the TRS and/or the CSI-RS. Thus, the technical solution disclosed herein allows the reference signals, which are usually used only for the UEs in the RRC_CONNECTED state, such, for example, as the TRS and the CSI-RS, to be made available for the UEs in the RRC_IDLE/RRC_INACTIVE state too.

Figure 2:
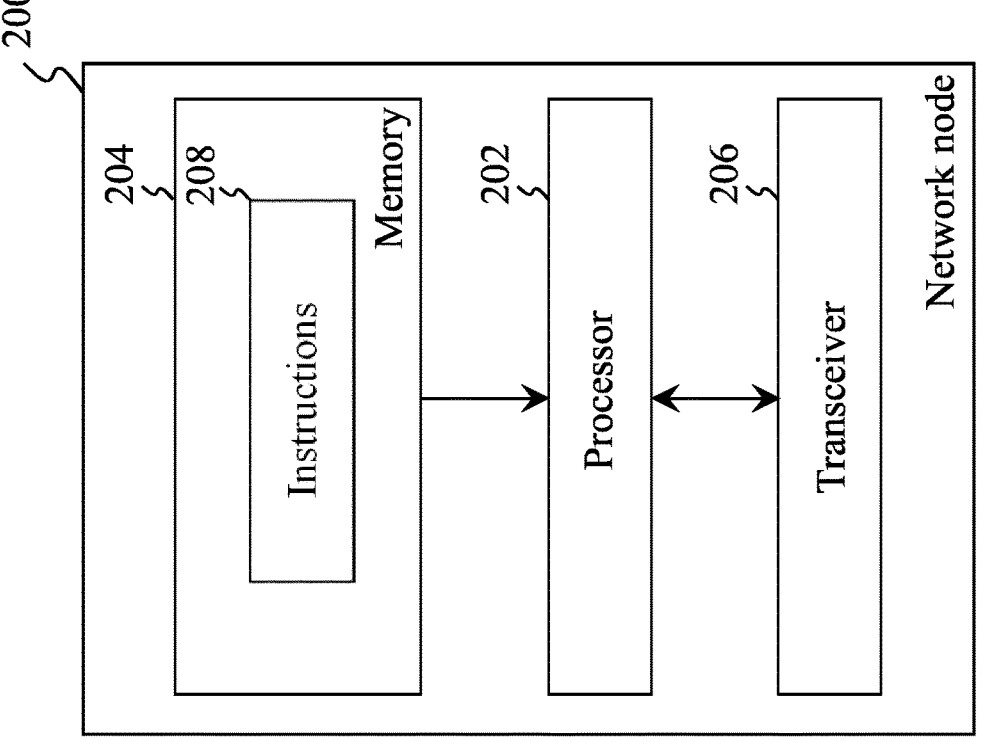
FIG. 2 shows a block-scheme of a network node in accordance with one example embodiment.

FIG. 2 shows a block-scheme of a network node 200 in accordance with one example embodiment. As shown in FIG. 2, the network node 200 comprises the following constructive elements: a processor 202, a memory 204, and a transceiver 206. The memory 204 is coupled to the processor 202 and stores processor-executable instructions 208 which, when executed by the processor 202, cause the processor 202 to perform the aspects of the present disclosure, as will be explained later. It should be noted that the number, arrangement and interconnection of the constructive elements constituting the network node 200, which are shown in FIG. 2, are not intended to be any limitation of the present disclosure, but merely used to provide a general idea of how the constructive elements may be implemented within the network node 200. In one other exemplary embodiment, the transceiver 206 may be implemented as two individual devices, with one for a receiving operation and another for a transmitting operation. Irrespective of its implementation, the transceiver 206 is implied to be capable of performing different operations required to perform the reception and transmission of different signals, such, for example, as signal modulation/demodulation, encoding/decoding, etc.

The processor 202 may be implemented as a central processing unit (CPU), general-purpose processor, single-purpose processor, microcontroller, microprocessor, application specific integrated circuit (ASIC), field programmable gate array (FPGA), digital signal processor (DSP), complex programmable logic device, etc. It should be also noted that the processor 202 may be implemented as any combination of one or more of the aforesaid. As an example, the processor may be a combination of two or more microprocessors.

The memory 204 may be implemented as a nonvolatile or volatile memory used in the modern electronic computing machines. As an example, the nonvolatile memory may include Read-Only Memory (ROM), ferroelectric Random-Access Memory (RAM), Programmable ROM (PROM), Electrically Erasable PROM (EEPROM), solid state drive (SSD), flash memory, magnetic disk storage (such as hard drives and magnetic tapes), optical disc storage (such as CD, DVD and Blu-ray discs), etc. As for the volatile memory, examples thereof include Dynamic RAM, Synchronous DRAM (SDRAM), Double Data Rate SDRAM (DDR SDRAM), Static RAM, etc.

The processor-executable instructions 208 stored in the memory 204 may be configured as a computer executable code which causes the processor 202 to perform the aspects of the present disclosure. The computer executable code may be written in any combination of one or more programming languages, such as Java, C++, or the like. In some examples, the computer executable code may be in the form of a high-level language or in a pre-compiled form, and be generated by an interpreter (also pre-stored in the memory 204) on the fly.

Figure 3:
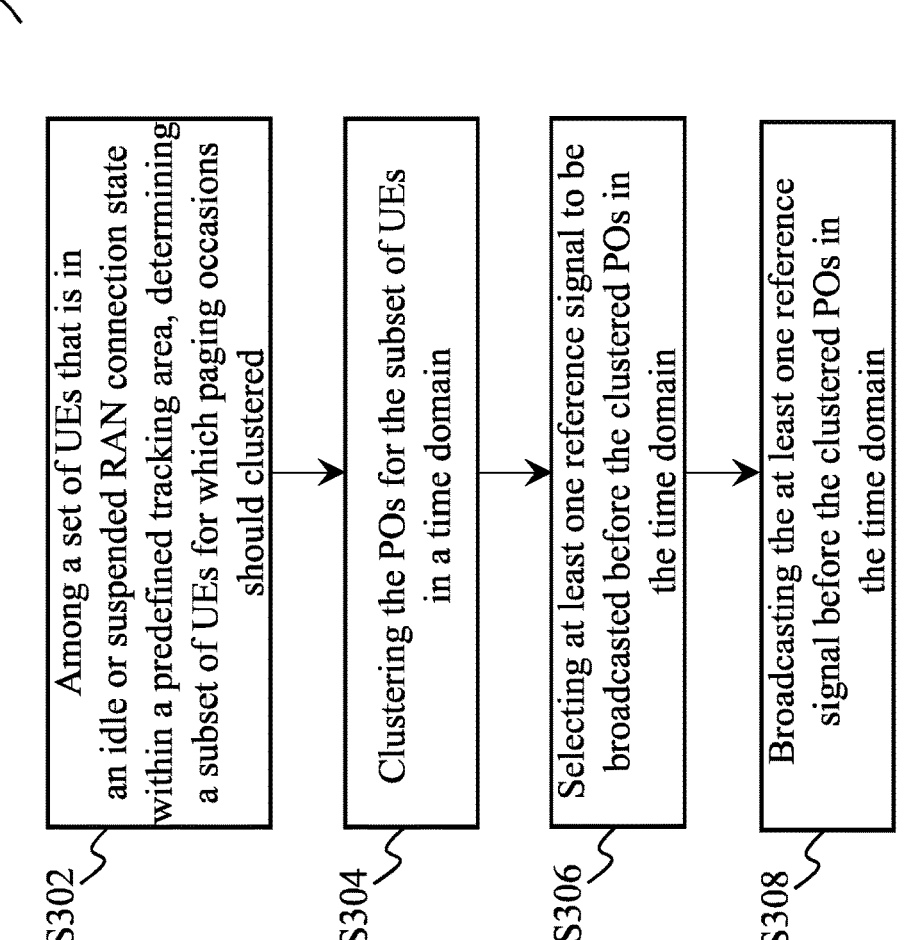
FIG. 3 shows a flowchart of a method for operating the network node shown in FIG. 1 in accordance with one example embodiment.

FIG. 3 shows a flowchart of a method 300 for operating the network node 200 in accordance with one example embodiment. Each of the steps of the method 300 is performed by corresponding one of the above-described constructive elements constituting the network node 200. The method 300 starts with a step S302, in which the processor 202 determines, among a set of UEs that is in the idle or suspended RAN connection state within a predefined tracking area, a subset of UEs for which POs should be clustered. The predefined tracking area may be a RAN Notification Area (RNA) as defined in the 5G NR standard, or a simple coverage area of the network node 200, or a predefined part of the coverage area of the network node 200 or the RNA. Then, the method 300 proceeds to a step S304, in which the processor 202 clusters or groups the POs for the subset of UEs in the time domain. As a result of the step S304, the processor 202 obtains a set of closely spaced POs in the time domain, which may be called a cluster of POs. The POs may unnecessarily be arranged in order within the cluster. The method 300 further proceeds to a step S306, in which the processor 202 select at least one reference signal to be broadcasted before the clustered POs in the time domain. Said selection of the at least one reference signal may depend on particular application and/or types of the UEs involved in the method 300. Although the at least one reference signal is intended for the UEs, it is up to each UE to decide whether to receive the at least one reference signal. Moreover, there may be multiple reference signals broadcasted by the network node 200; in this case, the processor 202 may be configured to group all the reference signals into a cluster of reference signals to be broadcasted before the clustered POs in the time domain. More specifically, the cluster of reference signals represents a set of closely spaced reference signals in the time domain. Similar to the clustered POs, the reference signals may unnecessarily be arranged in order within the cluster of reference signals. After that, the method 300 ends up with a step S308, in which the transceiver 206 is instructed by the processor 202 to broadcast the at least one reference signal shortly before the clustered POs in the time domain. Said "shortly before the clustered POs" or simply "before the clustered POs" used herein should be understood such that there is a finite time interval between the receiving times of the at least one reference signal and the cluster of the POs for the at least two UEs, which is small enough in order not lead to a long waiting (i.e. awakening) period for the at least two UEs, like the long waiting period 102 in FIG. 1. For example, such a time interval may be considered as the time interval 104 in FIG. 1. Of course, the exact duration of such a time interval will depend on particular applications, and for example, on requirements applied for the power consumption and processing capabilities of the UEs involved in the method 300 and/or the availability of downlink transmission resources.

Figure 4:
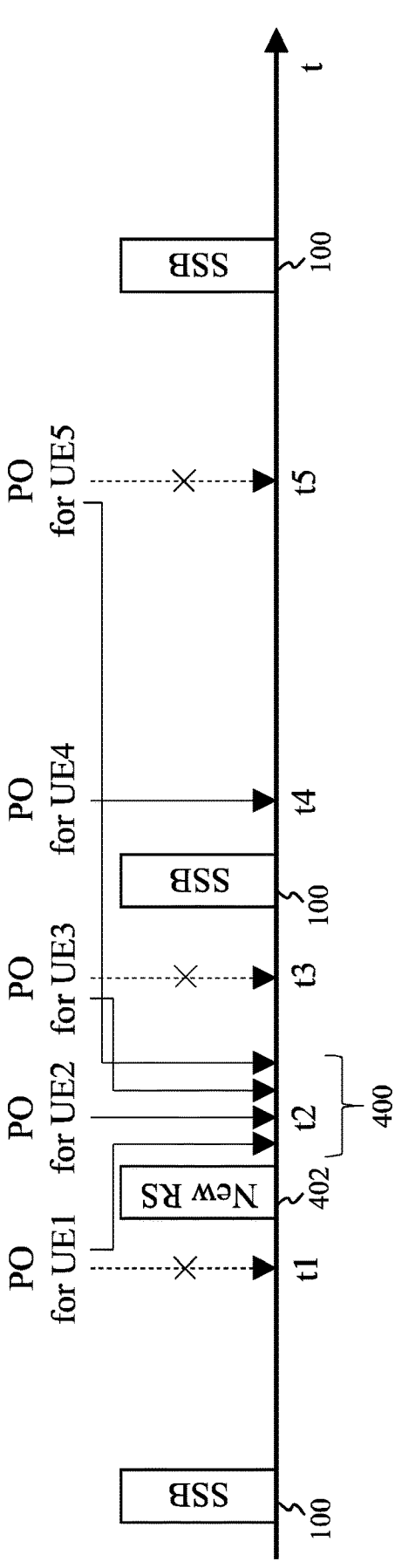
FIG. 4 shows the result of applying the method shown in FIG. 3 to the sequence of paging occasions shown in FIG. 1.

FIG. 4 shows the result of applying the method 300 to the sequence of the POs shown in FIG. 1. More specifically, the initial POs for UE1, UE3 and UE5, which correspond to the times t1, t3 and t5, respectively, are cancelled by the network node 200 (which is schematically shown by using the crisscrosses in FIG. 4). Instead, new POs are configured for UE1, UE3 and UE5, which are aligned or clustered with the initial PO for UE2, i.e. near the time t2. In other words, the network node 200 forms a cluster 400 consisting of the new POs for the UE1, UE3 and UE5 and the initial PO (t2) for UE2. The network node 200, i.e. the transceiver 206, is then configured to broadcast a new reference signal 402, such, for example, as a cluster of the TRS and the CSI-RS, for UE1, UE2, UE3 and UE5 shortly before the cluster 400. As for UE4, its initial PO is close to the nearest SSB 100, whereupon there is no need to cancel it and configure a new PO for UE4 within the cluster 400. Thus, the POs which result in long waiting (awakening) periods for the UEs are only subjected to said clustering.

In one example embodiment, the method 300 may comprise a further step of receiving UE notifications and/or preferences from the UEs. Each UE notification indicates that a certain UE is within the predefined tracking area. Each UE preference indicates that a certain UE requests for the network node 200 to broadcast the reference signal(s) before its PO (for the purpose of power saving). Said step of receiving may be performed by the transceiver 206 of the network node 200, and the processor 202 of the network node 200 may, in turn, use the UE notifications and/or preferences to properly perform the step S302 of the method 300. If the tracking area is represented by the RNA or its part, the UE notifications and/or preferences may be sent by the UEs via a legacy RNA update (RNAU) procedure. This is important for the network node 200 to determine in which cell(s) the network node 200 should broadcast the reference signals (e.g., the TRS and CSI-RS), because it is a waste of resources to broadcast the reference signals on many cells unnecessarily (e.g., when no/a limited number of UEs would be measuring the reference signals). For this reason, the example embodiments disclosed herein may be less applicable to the UEs in the idle RAN connection state unless the UEs are stationary, since due to mobility the UEs may change their cell transparently to the network node 200. Furthermore, the period for a location update procedure applicable to the UEs in the idle RAN connection state (Tracking Area update/location registration procedure) may be longer and the area may be larger than the RNA. This means that the network node 200 may have a limited capability to determine whether there is any UE in the idle RAN connection state under its coverage area at a given point in time.

In one example embodiment, the method 300 may comprise, before the step S308, a further step, in which the processor 202 instructs the transceiver 206 to inform the subset of UEs about the reference signal(s) by sending a presence indicator, a broadcasting-time indicator and/or a timer indicator for the reference signal(s) to the subset of UEs determined in the step S302 of the method 300. The presence indicator, the broadcasting-time indicator and/or the timer indicator may be sent in a System Information Broadcast (SIB) message, a Downlink Control Information (DCI) message or via RRC signalling to each UE of the subset of UEs at the time when that UE is moved to the idle or suspended RAN connection state.

The presence indicator may be represented by an indicator bit that indicates that the reference signal(s) will be broadcasted before the clustered POs. In other words, the presence indicator confirms that the network node 200 has performed said clustering in the step S304 for all or some of the POs (for example, the POs of UE1, UE3, UE5 given the situation illustrated in FIG. 4).

The broadcasting-time indicator indicates a time offset and/or a time window between the reference signal(s) and the clustered POs. The broadcasting-time indicator may be used by the network node 200 as an additional indication or confirmation that the network node 200 has performed said clustering in the step S304 for all or some of the POs (for example, the POs of UE1, UE3, UE5 given the situation illustrated in FIG. 4). Each UE of the subset of UEs, which is determined in the step S302 of the method 300, may search for and identify the exact location of the reference signal(s) within the time offset and/or the time window provided by the network node 200. Of course, this will have an effect on the power saving that can be achieved for different UEs in the subset of UEs depending on how their POs are time-spaced from the broadcasting time of the reference signal(s). Therefore, the time offset and/or the time window may be set based on the PO of each UE in the subset of UEs.

The timer indicator indicates that the reference signal(s) will be repeated at the next clustered X POs or be available for the next Y seconds. The introduction of such a timer allows the UEs to assume that the reference signal(s) is (are) always available (with a specified periodicity) until the timer expires. There may be mechanisms supported by the network node 200 to automatically change (shorten or extend) said X or Y of the timer, which could be based on either updated reading of signals from the normal SIBs (which are transmitted in connection with the regular SSB(s), or related to a certain control signal which is broadcasted along with the reference signal(s) (through some kind of a broadcast message similar to a group paging indication (with the purpose of indicating that the timer is extended in terms of said X or Y)—and the message may indicate a value to apply for the next period of the timer.

It should be noted that not all UEs may equally benefit from the reference signal(s) broadcasted before the clustered POs. For example, a larger benefit will be achieved for the UEs which have a shorter paging periodicity. If the paging periodicity is very long, it means that the UE rarely wakes up. Therefore, even though the UE may save a bit of power by having the PO and reference signals clustered together, the majority of the power consumption may be due to sleeping (or other procedures besides PO monitoring). As for the UE with the short paging periodicity, it will frequently wake up and therefore the power consumption due to PO monitoring and receiving the reference signal(s) constitute a larger part of the total power consumption. If the power consumption caused by "PO monitoring+receiving the reference signal(s)" is reduced, the benefit is therefore larger for such UE. Thus, in one example embodiment, the UE may inform the network node 200 about a potential need for power saving (e.g., via the UE preference, as noted above). Another example embodiment is possible, in which the UE informs the network node 200 of its preference and potential capability for the power saving via the RNAU notification.

Figure 5:
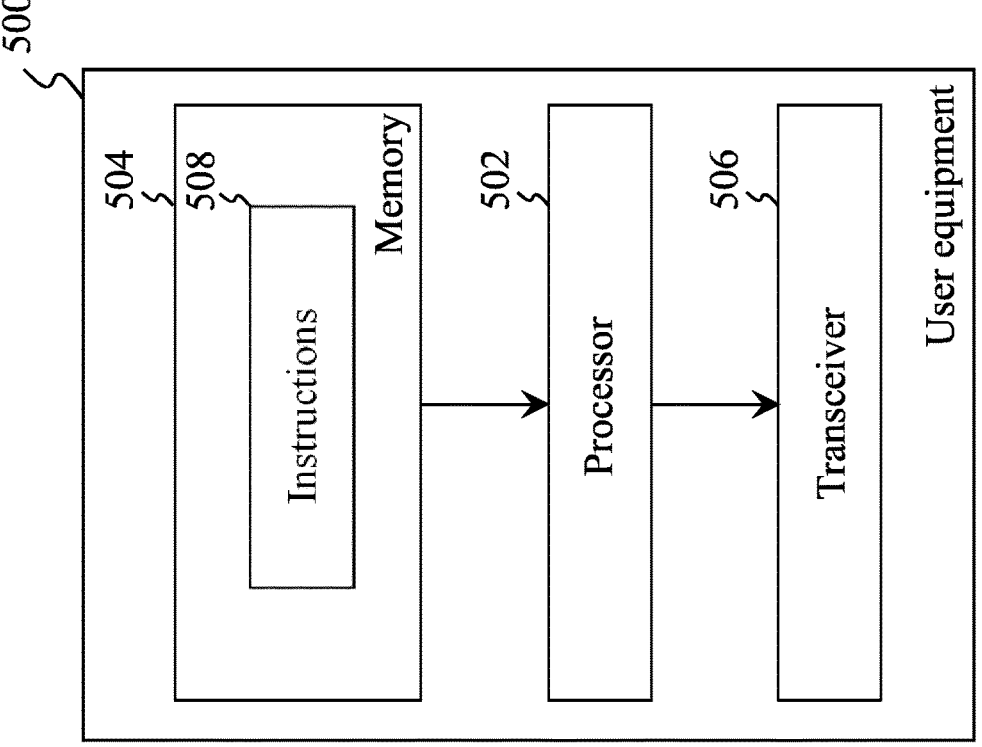
FIG. 5 shows a block-scheme of a UE for wireless communications in accordance with one example embodiment.

FIG. 5 shows a block-scheme of a UE 500 for wireless communications in accordance with one example embodiment. The UE 500 is intended to communicate with the network node 200 to gain the above-discussed power saving benefit. It should be noted that each of said UE1-UE5 may be implemented as the UE 500. As shown in FIG. 5, the UE 500 comprises the following constructive elements: a processor 502, a memory 504, and a transceiver 506. The memory 504 is coupled to the processor 502 and stores processor-executable instructions 508 which, when executed by the processor 502, cause the processor 502 to perform the aspects of the present disclosure, as will be explained later. Similar to the network node 200, the number, arrangement and interconnection of the constructive elements constituting the UE 500, which are shown in FIG. 5, are not intended to be any limitation of the present disclosure, but merely used to provide a general idea of how the constructive elements may be implemented within the UE 500.

Each of the processor 502, the memory 504 and the transceiver 506 may be implemented in the same or similar manner as the processor 202, the memory 204 and the transceiver 206, respectively. The same also refers to the processor-executable instructions 508: they may be configured in the same or similar manner as the processor-executable instructions 208.

Figure 6:
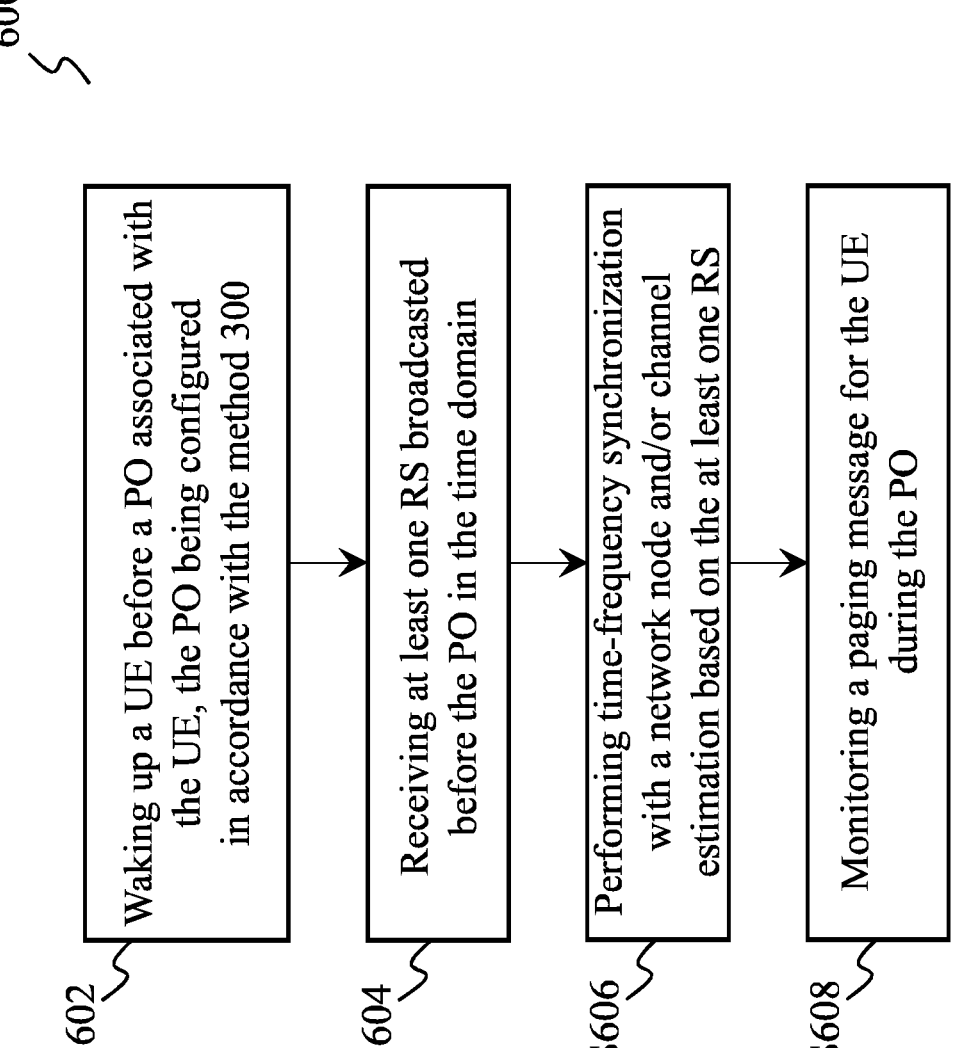
FIG. 6 shows a flowchart of a method for operating the UE shown in FIG. 5 in accordance with one example embodiment.

FIG. 6 shows a flowchart of a method 600 for operating the UE 500 in accordance with one example embodiment. Each of the steps of the method 600 is performed by the above-described constructive elements of the UE 500. The method 600 starts with a step S602, in which the processor 502 causes the transceiver 506 to wake up before a PO associated with the UE 500. The PO is configured by the network node 200 in accordance with the method 300. In other words, the PO of the UE 500 is clustered with at least one other PO associated with at least one other UE in a time domain. For example, said clustering may be performed by the network node 200, as discussed above for the POs of UE1, UE3 and UE5 (see also FIG. 4). The UE 500 and the at least one other UE may be both in the idle or suspended RAN connection state within the predefined tracking area (e.g., the RNA) of the network node 200. The method 600 further proceeds to a step S604, in which the transceiver 506 is caused by the processor 502 to receive the at least one reference signal broadcasted by the network node 200 before the PO of the UE 500 in the time domain. Similarly, the at least one reference signal may comprise the DLPRS, SSB, TRS, CSI-RS, or any combination thereof. After that, the transceiver 506 is caused, in a step S604, by the processor 502 to perform time-frequency synchronization with the network node 200 and/or channel estimation (i.e. for a communication channel between the UE 500 and the network node 200) based on the at least one reference signal. The method 600 ends up with a step S606, in which the transceiver 506 is caused by the processor 502 to check or monitor the presence of a paging message for the UE 500 during its PO.

In one example embodiment, the method 600 comprises a further step, in which the processor 502 causes the transceiver 506 to send the above-indicated UE notification and/or preference from the UE 500 to the network node 200. If the predefined tracking area is represented by the RNA, the transceiver 506 may send the UE notification and/or preference to the network node 200 via the RNAU procedure. By using such a UE notification and/or preference, the UE 500 may let the network node 200 know that the UE 500 is really within the tracking area and the UE configuration is suitable for the clustering of its PO with the POs of one or more other UEs.

In one example embodiment, the method 600 comprises a further step, in which the processor 502 causes the transceiver 506 to receive the above-described presence indicator, the broadcasting-time indicator and/or the timer indicator from the network node 200 when the UE 500 moves from the active RAN connection state to the idle or suspended RAN connection state. The presence indicator, the broadcasting-time indicator and/or the timer indicator may be received by the transceiver 506 in the SIB message, the DCI message or via the RRC signalling. By so doing, the UE 500 may be informed about the at least one reference signal, if required.

In one example embodiment, the method 600 comprises a further step, in which the processor 502 causes the transceiver 506 to receive the above-described control signal broadcasted by the network node 200 together with the at least one reference signal. By so doing, the UE 500 may be promptly informed about any changes relating to the timer indicator.

Figure 7:
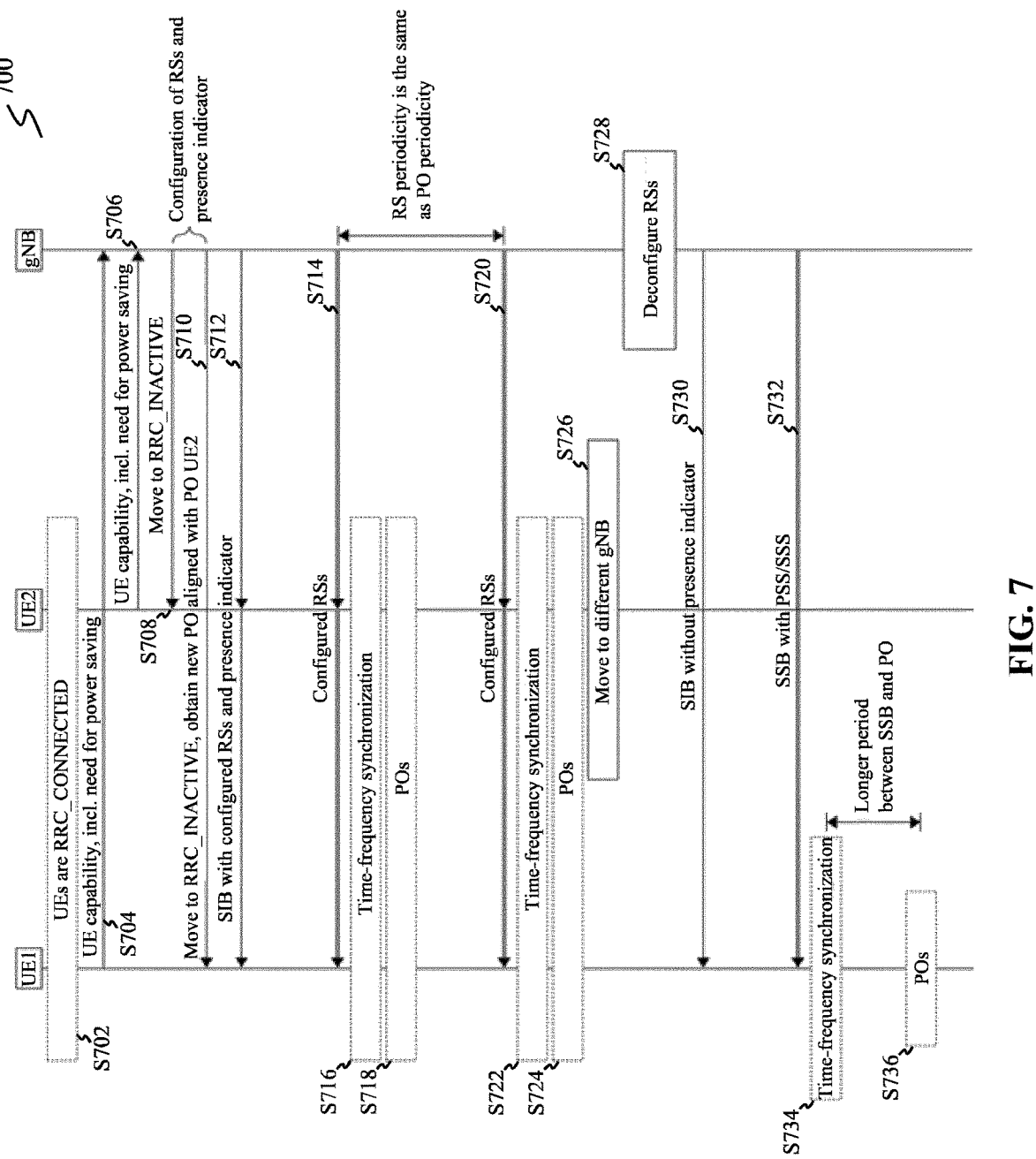
FIG. 7 shows a signalling diagram for using a presence indicator for reference signals to be sent shortly before clustered paging occasions in accordance with one example embodiment.

FIG. 7 shows a signalling diagram 700 for using the presence indicator in accordance with one example embodiment. In particular, the signalling diagram 700 illustrates how the presence indicator may be provided by the network node 200 (which is implemented as the gNB in this case) to two UEs, i.e. UE1 and UE2, through the RRC signalling or through the SIB. Each of UE1 and UE2 may be implemented as the UE 500 discussed above. The signalling diagram 700 starts with a step S702, in which UE1 and UE2 move to the RRC_CONNECTED state (which is one example of the active RAN connection state, as noted above). Further, UE1 informs the gNB about its capability, including the need for power saving (which in turn requires the reference signal(s) to be broadcasted from the gNB before the PO of E1), in a step S704, and UE2 does the same in a step S706. After that, the gNB causes UE2 to move to the RRC_INACTIVE state (which is one example of the suspended RAN connection state, as noted above) in a step S708, and causes UE1 to move to the RRC_INACTIVE state in a step S710. The steps S708 and S710 may be performed in parallel, if required. In the S710, the gNB also informs UE1 about a new PO configured for UE1 near the initial PO for UE2. Further, the signalling diagram 700 proceeds to a step S712, in which the gNB sends the SIB with configured reference signals (RSS) and the presence indicator for the reference signals to UE1 and UE2. After that, the gNB broadcasts the RSs themselves for UE1 and UE2 in a step S714. UE1 and UE2 receive the RSs and, based on the RSs, perform time-frequency synchronization with the gNB in a step S716, whereafter UE1 and UE2 check or monitor for corresponding paging messages at their clustered POs in a step S718. Next steps S720-S724 fully repeat the steps S714-S718, respectively. It should be noted that the periodicity of the RSs is aligned with the periodicity of the POs. Further, it is assumed that UE2 moves to a different gNB (or to the RRC_CONNECTED state) in a next step S726. This means that UE2 is no longer in need of the RSs broadcasted shortly before the clustered POs. When the current gNB observes that move of UE2, it removes, in a step S728, the presence indicator and stops sending the RSs before the clustered POs, i.e. deconfigures the RSs. The gNB informs UE1 about that via the SIB in a step S730. After that, the signalling diagram 700 proceeds to a step S732, in which the gNB broadcasts the SSB with the PSS/SSS for UE1, instead of the previous RSs. In other words, UE1 should now rely on the SSB for the time-frequency synchronization in a step S734. The signalling diagram 700 ends up with a step S736, in which UE1 receives its paging message at the PO aligned with the SSB (as shown in FIG. 7, there is now a longer waiting period between the SSB and the PO for UE1).

Figure 8:
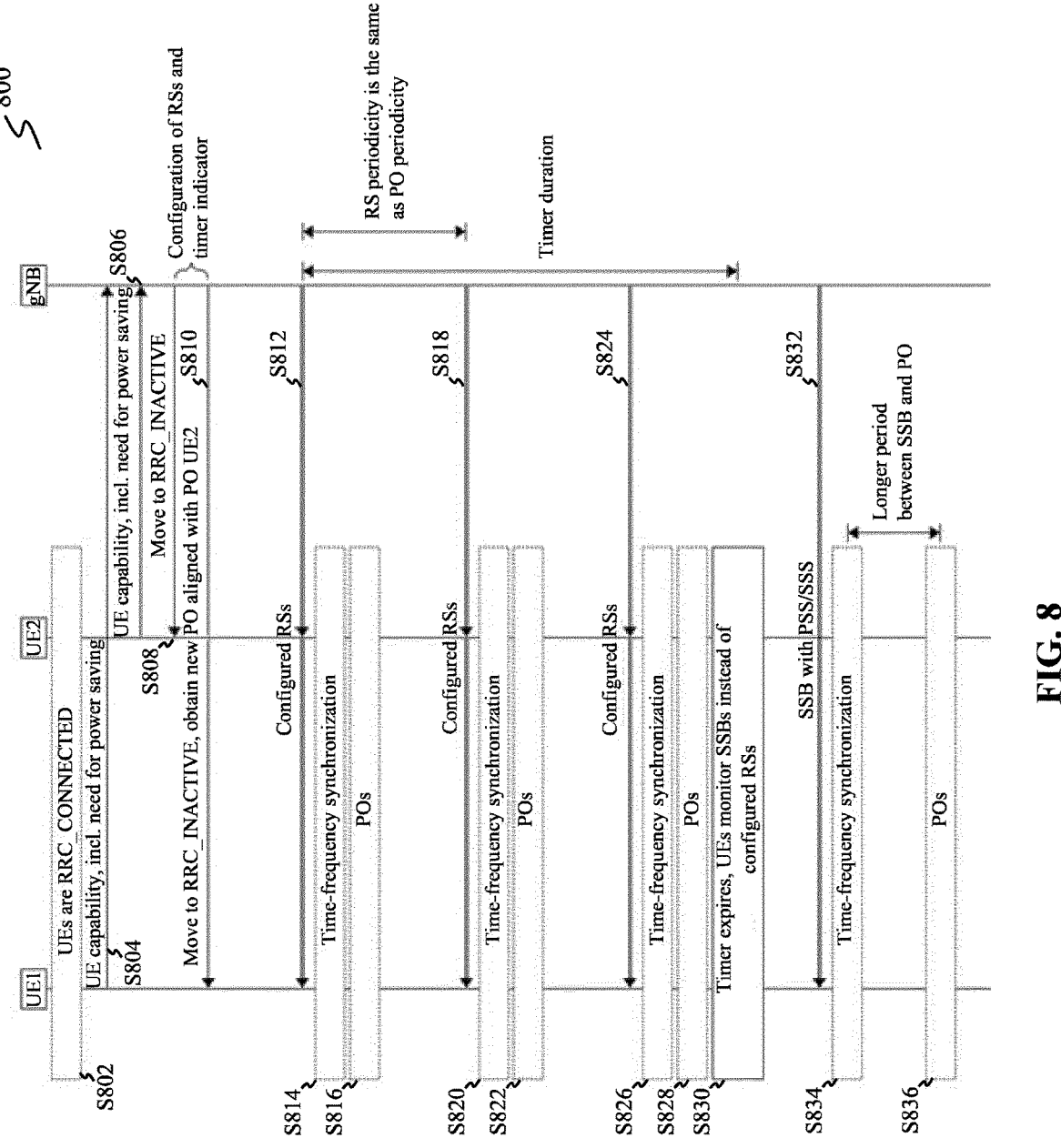
FIG. 8 shows a signalling diagram for using a timer indicator for reference signals to be sent shortly before clustered paging occasions in accordance with one example embodiment.

FIG. 8 shows a signalling diagram 800 for using the timer indicator in accordance with one example embodiment. In this case, the timer indicator is used instead of the presence indicator, but this should not be construed as any limitation of the present disclosure—the timer indicator may be used in concert with at least one of the presence indicator and the broadcasting-time indicator in some other example embodiments. Similar to the signalling diagram 700, the signalling diagram 800 illustrates how the timer indicator may be applied by the network node 200 (which is implemented as the gNB in this case) for the same UE1 and UE2 (each of which may be implemented as the UE 500 discussed above). The signalling diagram 800 starts with a step S802, in which UE1 and UE2 move to the RRC_CONNECTED state. Further, UE1 informs the gNB about its capability, including the need for power saving (which in turn requires the reference signal(s) to be broadcasted from the gNB before the PO of E1), in a step S804, and UE2 does the same in a step S806. After that, the gNB causes UE2 to move to the RRC_INACTIVE state in a step S808 and causes UE1 to move to the RRC_INACTIVE state in a step S810. The steps S808 and S810 may be performed in parallel, if required. In the step S810, the gNB also informs UE1 about a new PO configured for UE1 near the initial PO of UE2. Further, the signalling diagram 800 proceeds to a step S812, in which the gNB broadcasts configured RSs for UE1 and UE2. UE1 and UE2 receive the RSs and, based on the RSs, perform the time-frequency synchronization with the gNB in a step S814, whereafter UE1 and UE2 check or monitor for corresponding paging messages at their clustered POs in a step S816. UE1 and UE2 repeat the same at least twice in next steps S818-S822, S824-S828 until the timer expires in a step S830. The gNB stops sending the RSs, and UE1 and UE2 monitor for the SSBs instead of the configured RSs from now on, i.e. starting from the step S830. In other words, UE1 and UE2 should now rely on the SSBs for the time-frequency synchronization with the gNB. The gNB broadcasts the SSBs with the PSS/SSS for UE1 and UE2 in a next step S832. The signalling diagram 800 ends up with a step S834, in which UE1 and UE2 perform the time-frequency synchronization based on the received SSBs, and a step S836, in which each of UE1 and UE2 checks or monitors for its paging message at the PO aligned with the nearest SSB (as shown in FIG. 8, there is now a longer waiting period between the nearest SSB and the PO for each of UE1 and UE2).

Figure 9:
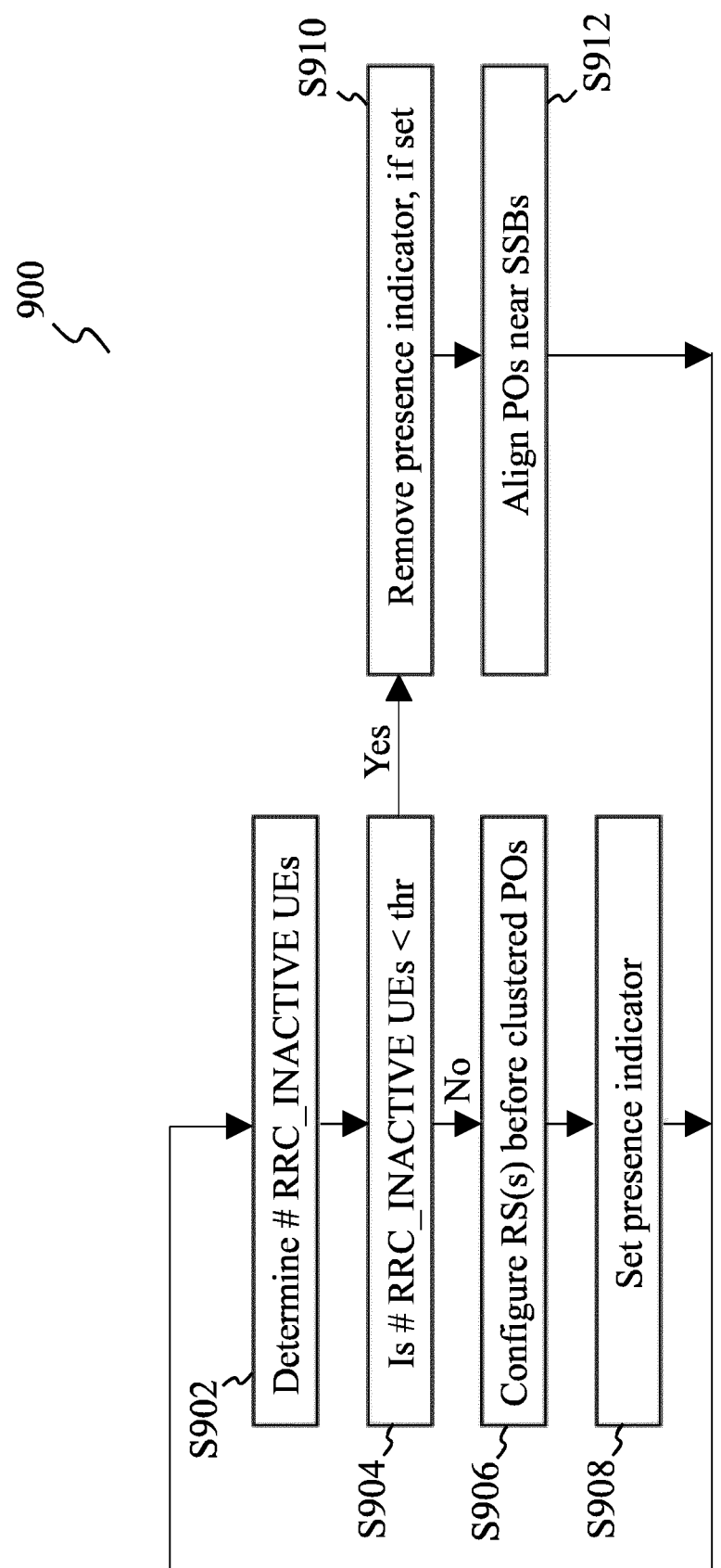
FIG. 9 shows a flowchart for determining when to apply the method shown in FIG. 3 to the paging occasions of the UEs in accordance with one example embodiment.

FIG. 9 shows a flowchart 900 for determining when to apply the method 300 to the POs of the UEs in accordance with one example embodiment. In general, the whole flowchart 900 may be implemented as further one or more steps of the method 300, which should be performed before the step S304 of the method 300. As shown in FIG. 9, the flowchart 900 starts with a step S902, in which the processor 202 of the network node 200 determines a number of the UEs (each implemented, for example, as the UE 500) in the RRC_INACTIVE state. Instead of the RRC_INACTIVE state, there may be the UEs in the RRC_IDLE state whose number is subjected to said determination in the step S902. After that, the flowchart 900 proceeds to a step S904, in which the processor 202 checks whether the number of the UEs in the RRC_INACTIVE state is less than a threshold value. If the step 904 yields "No", a next step S906 is initiated, in which the processor 202 substantially performs the steps S304-S306 of the method 300 and selects at least one reference signal to be broadcasted shortly before the clustered POs in the time domain. The flowchart 900 may then proceed to a step S908, in which the processor 202 sets the presence indicator for said at least one reference signal, as explained above with reference to FIG. 7. As an alternative or addition, there may be the broadcasting-time indicator and/or timer indicator set in the step S908. However, if there is "Yes" obtained in the step S904, i.e. the number of the UEs in the RRC_INACTIVE state is less than the threshold value, the flowchart 900 goes to a step S910, in which the processor 202 removes the presence indicator (and/or the timer indicator), if present, and to a step S912, in which the processor 202 aligns the POs of the UEs with the SSBs without having to cluster them in the time domain. By so doing, it is possible to reasonably use said clustering only for the case of multiple UEs; when the number of the UEs is low, i.e. less than the threshold value, the network node 200 may initially align the POs of the UEs with the SSBs. The whole flowchart 900 may be repeatedly performed by the network node 200, for example, at regular intervals.

It should be noted that each block, step or operation of the methods 300 and 600, the signalling diagrams 700, 800 and the flowchart 900, or any combinations of the blocks, steps or operations, can be implemented by various means, such as hardware, firmware, and/or software. As an example, one or more of the blocks, steps or operations described above can be embodied by processor executable instructions, data structures, program modules, and other suitable data representations. Furthermore, the processor executable instructions which embody the blocks, steps or operations described above can be stored on a corresponding data carrier and executed by at least one processor implementing functions of the network node 200 and the UE 500, respectively. This data carrier can be implemented as any computer-readable storage medium configured to be readable by said at least one processor to execute the processor executable instructions. Such computer-readable storage media can include both volatile and nonvolatile media, removable and non-removable media. By way of example, and not limitation, the computer-readable media comprise media implemented in any method or technology suitable for storing information. In more detail, the practical examples of the computer-readable media include, but are not limited to information-delivery media, RAM, ROM, EEPROM, flash memory or other memory technology, CD-ROM, digital versatile discs (DVD), holographic media or other optical disc storage, magnetic tape, magnetic cassettes, magnetic disk storage, and other magnetic storage devices.

It should also be noted that the present disclosure is not limited to clustering the POs only. One other example embodiment is possible, in which the network node 200 may instead cluster RNA update periods for multiple UEs, like the UE 500, in the time domain in the step S304 of the method 300, such that at least one reference signal may be broadcasted from the network node 200 shortly before the clustered RNA update periods in the step S310 of the method 300.

Although the example embodiments of the present disclosure are described herein, it should be noted that any various changes and modifications could be made therein, without departing from the scope of legal protection which is defined by the appended claims. In the appended claims, the word "comprising" and its derivatives does not exclude other elements or operations, and the indefinite article "a" or "an" does not exclude a plurality. The mere fact that certain measures are recited in mutually different dependent claims does not indicate that a combination of these measures cannot be used to advantage.

The invention claimed is:

1. A network node comprising:
a transceiver;
a non-transitory memory storing processor-executable instructions;
at least one processor coupled to the memory and configured, when executing the processor-executable instructions, to:
among a set of user equipments that is in an idle or suspended radio access network connection state within a predefined tracking area, determine a subset of the user equipments for which paging occasions are to be clustered;
cluster the paging occasions for the subset of the user equipments in a time domain;
select at least one reference signal to be broadcasted before the clustered paging occasions in the time domain; and
cause the transceiver to broadcast the at least one reference signal before the clustered paging occasions in the time domain,
wherein the transceiver is further configured to receive user equipment notifications and preferences from the subset of the user equipments, each user equipment notification indicating that a certain user equipment is within the predefined tracking area, and each user equipment preference indicating that a certain user equipment requests the network node to broadcast the at least one reference signal before the paging occasion of the user equipment, and
wherein the at least one processor is configured to perform the determining based on the user equipment notifications and/or preferences.

2. The network node of claim 1, wherein the at least one reference signal comprises a Downlink Positioning Reference Signal (DLPRS), a Synchronization Signal Block (SSB) comprising a Primary Synchronization Signal (PSS) and a Secondary Synchronization Signal (SSS), a Tracking Reference Signal (TRS), a Channel State Information Reference Signal (CSI-RS), or any combination thereof.

3. The network node of claim 1, wherein the predefined tracking area comprises a RAN Notification Area (RNA), and the transceiver is configured to receive the user equipment notifications and/or preferences sent by the subset of the user equipments via an RNA update (RNAU) procedure.

4. The network node of claim 1, wherein the at least one processor is further configured to cause the transceiver to inform the subset of the user equipments about the at least one reference signal with sending a presence indicator, a broadcasting-time indicator and/or a timer indicator for the at least one reference signal to the subset of the user equipments, and wherein the presence indicator indicates that the at least one reference signal will be broadcasted before the clustered paging occasions, the broadcasting-time indicator indicates a time offset and/or a time window between the at least one reference signal and the clustered paging occasions, and the timer indicator indicates that the at least one reference signal will be repeatedly broadcasted for a predefined number of next clustered paging occasions for the subset of the user equipments or for a predefined time period.

5. The network node of claim 4, wherein the transceiver is further configured to send, to each user equipment of the subset of the user equipments, the presence indicator, the broadcasting-time indicator and/or the timer indicator in a System Information Broadcast (SIB) message, a Downlink Control Information (DCI) message or via Radio Resource Control (RRC) signalling at the time when that UE is moved to the idle or suspended RAN connection state.

6. The network node of claim 4, wherein the at least one processor is further configured to cause the transceiver to broadcast a control signal together with the at least one reference signal, the control signal indicating that the predefined number of next clustered paging occasions or the predefined time period indicated in the timer indicator will be changed in a given way.

7. The network node of claim 1, wherein the at least one processor is configured to cluster the paging occasions if a size of the subset of the user equipments is more than a threshold value.

8. A method for operating a network node, comprising:
among a set of user equipments that is in an idle or suspended radio access network connection state within a predefined tracking area, determining a subset of the user equipments for which paging occasions should are to be clustered;
clustering the paging occasions for the subset of the user equipments in a time domain;
selecting at least one reference signal to be broadcasted before the clustered paging occasions in the time domain;
broadcasting the at least one reference signal before the clustered paging occasions in the time domain; and
receiving user equipment notifications and preferences from the subset of the user equipments, each user equipment notification indicating that a certain user equipment is within the predefined tracking area, and each user equipment preference indicating that a certain user equipment requests the network node to broadcast the at least one reference signal before the paging occasion of the user equipment,
wherein the determining is performed based on the user equipment notifications and/or preferences.

9. The method of claim 8, wherein the at least one reference signal comprises a Downlink Positioning Reference Signal (DLPRS), a Synchronization Signal Block (SSB) comprising a Primary Synchronization Signal (PSS) and a Secondary Synchronization Signal (SSS), a Tracking Reference Signal (TRS), a Channel State Information Reference Signal (CSI-RS), or any combination thereof.

10. The method of claim 8, wherein the tracking area is a RAN Notification Area (RNA), and said receiving comprises receiving the user equipment notifications and/or preferences sent by the subset of the user equipments via an RNA update (RNAU) procedure.

11. The method of claim 8, further comprising, before said broadcasting, informing the subset of the user equipments about the at least one reference signal with sending a presence indicator, a broadcasting-time indicator and/or a timer indicator for the at least one reference signal to the subset of the user equipments, and wherein the presence indicator indicates that the at least one reference signal will be broadcasted before the clustered paging occasions, the broadcasting-time indicator indicates a time offset and/or a time window between the at least one reference signal and the clustered paging occasions, and the timer indicator indicates that the at least one reference signal will be repeatedly broadcasted for a predefined number of next clustered paging occasions for the subset of the user equipments or for a predefined time period.

12. The method of claim 11, wherein said sending the presence indicator, the broadcasting-time indicator and/or the timer indicator comprises sending, to each user equipment of the subset of the user equipments, the presence indicator, the broadcasting-time indicator and/or the timer indicator in a System Information Broadcast (SIB) message, a Downlink Control Information (DCI) message or via Radio Resource Control (RRC) signalling at the time when that UE is moved to the idle or suspended RAN connection state.

13. The method of claim 11, further comprising broadcasting a control signal together with the at least one reference signal, the control signal indicating that the predefined number of next clustered paging occasions or the predefined time period indicated in the timer indicator will be changed in a given way.

14. The method of claim 8, wherein said clustering the paging occasions is performed if a size of the subset of the user equipments is more than a threshold value.

15. A user equipment for wireless communications, the user equipment being in an idle or suspended radio access network connection state within a predefined tracking area of the network node according to claim 1, and the user equipment comprising:

a transceiver;

a non-transitory memory storing processor-executable instructions;

at least one processor coupled to the memory and configured, when executing the processor-executable instructions, to cause the transceiver to:

wake up before a paging occasion associated with the user equipment, the paging occasion being configured with the network node according to claim 1;

receive at least one reference signal broadcasted with the network node according to claim 1 before the paging occasion in the time domain;

perform time-frequency synchronization and/or channel estimation based on the at least one reference signal; and monitor a paging message for the user equipment during the paging occasion.

16. A method for operating a user equipment for wireless communications, the user equipment being in an idle or suspended radio access network connection state within a predefined tracking area of the network node according to claim 1, and the method comprising:

waking up the user equipment before a paging occasion associated with the user equipment the paging occasion being configured with the network node according to claim 1;

receiving at least one reference signal broadcasted with the network node according to claim 1 before the paging occasion in the time domain;

performing time-frequency synchronization and/or channel estimation based on the at least one reference signal; and monitoring a paging message for the user equipment during the paging occasion.

* * * * *